United States Patent
Escudero et al.

(10) Patent No.: US 11,165,837 B2
(45) Date of Patent: Nov. 2, 2021

(54) VIEWING A VIRTUAL REALITY ENVIRONMENT ON A USER DEVICE BY JOINING THE USER DEVICE TO AN AUGMENTED REALITY SESSION

(71) Applicant: Microsoft Technology Licensing, LLC, Redmond, WA (US)

(72) Inventors: Daniel Escudero, San Francisco, CA (US); Toby Gilbert, Banstead (GB); Jose Antonio Santano Gonzalez, Farnborough (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/945,627

(22) Filed: Jul. 31, 2020

(65) Prior Publication Data
US 2020/0366720 A1    Nov. 19, 2020

Related U.S. Application Data (63) Continuation of application No. 16/175,765, filed on Oct. 30, 2018, now Pat. No. 10,771,512.

(Continued)

(51) Int. Cl.
*G02B 27/01* (2006.01)
*H04L 29/06* (2006.01)
(Continued)

(52) U.S. Cl.
CPC ...... *H04L 65/1076* (2013.01); *G02B 27/0172* (2013.01); *G06K 7/10722* (2013.01);
(Continued)

(58) Field of Classification Search
CPC . H04L 65/1076; H04L 65/1069; H04L 65/38; G02B 27/0172; G06K 7/10722; G06K 7/1417; G06T 19/006
See application file for complete search history.

(56) References Cited

U.S. PATENT DOCUMENTS

2014/0128161 A1* 5/2014 Latta .................. A63F 13/23
                                                     463/42
2018/0204383 A1* 7/2018 Licht ..................... G06Q 20/18

OTHER PUBLICATIONS

Ethan Gaebel et al: "Looks Good To Me", Trustworthy Embedded Devices, ACM, 2 Penn Plaza, Suite 701 New York NY 10121-0701 USA, Oct. 28, 2016 (Oct. 28, 2016), pp. 57-67, XP058300355, DOI: 10.1145/2995289,2995295 ISBN: 978-1-4503-4567-5 (Year: 2016).*

* cited by examiner

*Primary Examiner* — Lisa S Landis (57) ABSTRACT

A system for augmented reality viewing generates a unique code corresponding to a user device. Information corresponding to the unique code is broadcast from the user device and the unique code is displayed on the user device. The information is configured to be received by an augmented reality device. A camera of an augmented reality device is activated upon receiving the information broadcast from the user device. The camera is configured to scan for the unique code. The user device is joined to an augmented reality session of the augmented reality device in response to the camera scanning the unique code displayed on the user device and by transmitting identification information to the user device based on the unique code. The simplified joining process improves the user experience and allows the user to more quickly view an augmented reality environment directly on a user device.

20 Claims, 6 Drawing Sheets

Related U.S. Application Data

(60) Provisional application No. 62/673,808, filed on May 18, 2018.

(51) Int. Cl.
*G06T 19/00* (2011.01)
*G06K 7/10* (2006.01)
*G06K 7/14* (2006.01)

(52) U.S. Cl.
CPC .......... *G06K 7/1417* (2013.01); *G06T 19/006* (2013.01); *H04L 65/1069* (2013.01); *H04L 67/38* (2013.01); *G02B 2027/014* (2013.01); *G02B 2027/0138* (2013.01); *G02B 2027/0174* (2013.01); *G06T 2219/024* (2013.01)

VIEWING A VIRTUAL REALITY ENVIRONMENT ON A USER DEVICE BY JOINING THE USER DEVICE TO AN AUGMENTED REALITY SESSION

CROSS-REFERENCE TO RELATED APPLICATION

This application is a continuation of and claims priority to U.S. application Ser. No. 16/175,765, entitled "VIEWING A VIRTUAL REALITY ENVIRONMENT ON A USER DEVICE BY JOINING THE USER DEVICE TO AN AUGMENTED REALITY SESSION," filed Oct. 30, 2018 which claims the benefit of priority under 35 USC § 119(e) of U.S. Provisional Patent Application No. 62/673,808, filed May 18, 2018, the contents of which are incorporated by reference herein in their entirety.

BACKGROUND

Augmented reality devices allow a user to view a real-world scene through a lens with holograms appearing as part of that real-world scene. Augmented reality and virtual reality systems are increasingly popular, particularly for applications in which a user can immerse himself or herself into an alternate reality environment when wearing a head-mounted display that displays virtual and/or augmented reality user experiences.

For example, augmented reality allows a user to see through a head-mounted display, such as glasses or other wearable display devices having near-eye display panels as lenses to view the surrounding environment, while also seeing images of virtual objects. These virtual objects often include holograms that are generated for display and appear as a part of the environment. Thus, augmented reality systems display various types of virtual images or graphics that enhance or augment the environment that a user experiences.

While some known augmented realty devices allow for recording the augmented reality environment being viewed by the user, the recording can only be done from the viewpoint of the user of the augmented reality device (e.g., the wearer of the head-mounted display) and is typically acquired at a lower resolution. In order to view or record the augmented reality environment from a different perspective, such as with a device that can view the augmented reality environment, but record at a higher resolution, a time-consuming setup process of the device is performed. For example, the setup process involves extensive arrangement and orientation of the device(s) for recording, as well as synchronizing the devices with the augmented reality system to allow for proper recording of the augmented reality environment. Thus, there is often no easy way to view and record augmented reality scenes using devices that are not the primary scene generator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for viewing an augmented reality environment comprises generating a unique code corresponding to a user device and displaying the unique code on the user device. The computerized method further comprises broadcasting information formatted for reception by an augmented reality device. The broadcast information is based at least in part on the unique code. The method also comprises automatically joining the user device to an augmented reality session of the augmented reality device in response to the augmented reality device scanning the unique code displayed on the user device. At least one hologram in the augmented reality session is spatially aligned to a view of the user device Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to allow viewing and recording of augmented reality environments from user devices in a shared experience session with the augmented reality device generating the augmented reality scene. For example, remote viewing and recording of the augmented reality environment (that includes one or more holograms) is easily accomplished by a user device in accordance with the present disclosure. In one example, an augmented reality capture tool allows smartphone users to see what Microsoft HoloLens® device users are seeing and doing.

Some configurations described herein allow for an image stream that is higher resolution and lag free to be made available by a simple process for inviting non-HoloLens device users to experience holograms directly from the user's phone or tablet. As a result, a faster and more efficient setup process for viewing augmented reality scenes is provided that improves the user experience. In this manner, when a processor is programmed to perform the operations described herein, the processor is used in an unconventional way, and allows the more efficient setup and viewing of an augmented reality environment by a user device. Moreover, in various examples, with the user devices, recording of the augmented reality environment can be performed at a higher resolution than that with the recording capabilities of the augmented reality device viewing the augmented reality scene.

In some examples, a person can wear a head-mounted display unit to immerse himself or herself in a virtual and/or augmented reality environment. Generally, the term "alternate reality" is used herein to refer to devices and systems that are implemented for virtual reality and/or augmented reality. A head-mounted display unit is an alternate reality device that can be worn by a user and implemented with various systems and sensors to generate a hologram (e.g., a generated image or graphic) that appears in an environment with real objects (e.g., a HoloLens® device). Various examples can be implemented in connection with any type of device capable of operating in a virtual and/or augmented reality environment.

For example, an alternate reality device is implemented with various components in the virtual and/or augmented reality environment technology, such as a processing system and memory (e.g., non-volatile, physical memory), and with any number and combination of differing components. In some examples, the processing system includes multiple and/or different processors, such as a microprocessor, a graphics processor, and/or a high-speed, dedicated processor for tracking motion of the alternate reality device. The alternate reality device includes a power source, such as a battery, to power the various device components. Further, the alternate reality device in some examples is a wireless communication-enabled device and can include different wireless radio systems, such as for Wi-Fi, Bluetooth®, Mobile Broadband, LTE, as well as 802.11a/b/g/n/ac network connectivity technologies, and/or any other wireless communication systems or formats. Generally, the alternate reality device implements one or more wireless communication systems that each include a radio device, antenna, and chipset that is implemented for wireless communication with other devices, networks, and services.

The alternate reality device can include a tracking system for entity tracking that is implemented to recognize and track movement of an entity in the environment. For example, the tracking system can recognize an entity in the environment as a person or features of the person (e.g., an arm, hand, head, etc.), an animal (e.g., a dog or cat), or an object, such as a chair, a table, or other item that can be moved by a person. The tracking system also includes in some examples, a motion sensing or any other human motion capture system to track the movement of the person or the feature of the person in the environment.

Additionally, an imaging system, such as with an infra-red projector, a depth sensor, and/or a depth camera (or cameras) allows capture of images of the environment in which the device is located. The imaging system of the alternate reality device in some examples has one or more cameras that capture images of the environment in which the alternate reality device is being used. In various examples, the cameras are visual light cameras, such as high-speed monochromatic or black-and-white cameras that capture the images in the three-dimensional (3D) environment.

In various examples, the alternate reality device is any type of display system providing a view through optics so that the generated image that is displayed to the user is overlaid onto a real-world view. This augmented reality or equivalently mixed reality is provided in some examples by the HoloLens® device. Thus, as a wearable display system, an augmented reality device can incorporate components, such as processing unit(s), computer interface(s) that provide network connectivity, and camera(s) etc. These components can be housed in the headpiece, as in the HoloLens®, or in a separate housing connected to the headpiece by wireless or wired means.

The alternate reality device also includes an imaging application that is implemented to generate holograms for display. The imaging application can be implemented as a software application or modules, such as computer-executable software instructions that are executable with the processing system. The imaging application can be stored on computer-readable storage memory (e.g., the memory), such as any suitable memory device or electronic data storage implemented in the alternate reality device.

Figure 1:
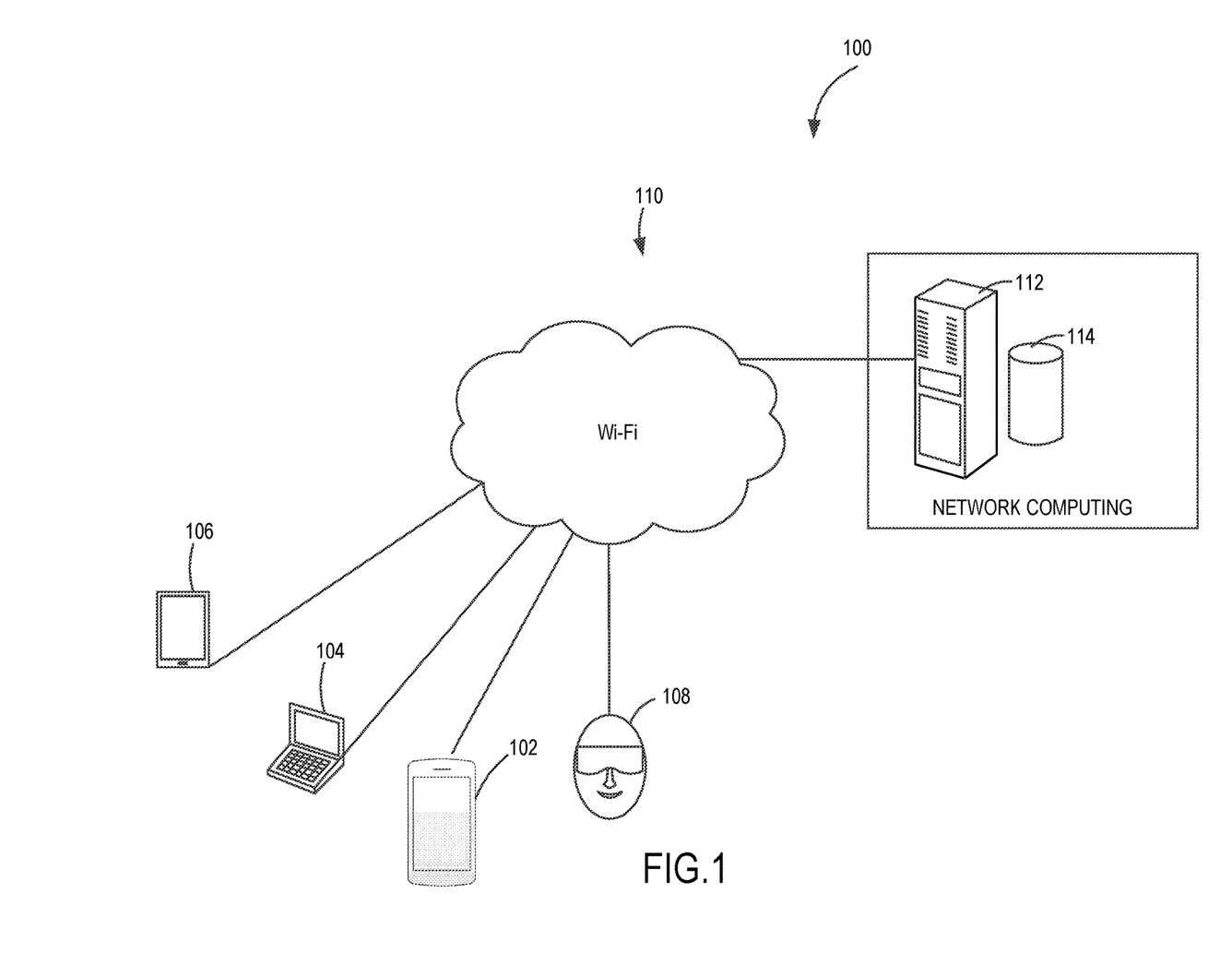
FIG. 1 is an a block diagram illustrating a system according to an embodiment.

FIG. 1 is a schematic block diagram of a system 100 deployed in a WiFi communication configuration in this example that allows one or more end user computing devices, such as a smartphone 102, a laptop computer 104 and/or a tablet 106 to experience an augmented reality environment (e.g., experience holograms) of an augmented reality head worn computer 108 (e.g., HoloLens® device). A user is able to experience holograms directly from the end user computing devices by entering a shared experience session with the augmented reality head worn computer 108. In the illustrated example, the end user computing devices and the augmented reality head worn computer 108 are connected via a computer network 110, shown as a WiFi network. For example, the user of the augmented reality head worn computer 108 is able to invite non-HoloLens users, namely the users of the smartphone 102, the laptop computer 104 and/or the tablet 106 to experience holograms directly from the end user computing devices. In some examples, the non-HoloLens users, namely the users of the smartphone 102, the laptop computer 104 and/or the tablet 106 request to join the augmented reality session of the augmented reality head worn computer 108. In some examples, the shared session experience allows the smartphone 102, the laptop computer 104 and/or the tablet 106 to view holograms and record the augmented reality environment of the augmented reality head worn computer 108.

The computer network 110 in some examples is also connected to one or more computers 112 and storage 114, which can be networked computers or storage devices. It should be noted that in various examples, all of the augmented reality functionality is implemented within the augmented reality head worn computer 108 and the end user computing devices have all of the functionality therein to allow for joining the augmented reality experience. In some examples, the functionality of the augmented reality system described herein is performed, at least in part, by one or more processors or hardware logic components within one or more different components or devices. For example, and without limitation, illustrative types of hardware logic components that are used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

In one example, the system 100 allows for automatic interfacing with the augmented reality head worn computer 108 by one of more of the end user computing devices. As described in more detail herein, using an authentication code or marker, such as an augmented reality marker (AR marker), a simplified authentication and connection arrangement is provided. Thus, in various examples, a marker-type augmented reality configuration is used, wherein the AR markers or other visual cues trigger the automatic connection to a shared experience session. It should be noted that the marker can be any type of visual indicator and in some examples is displayed on the end user computing device during an authentication and joining process. For example, a camera of the augmented reality head worn computer 108 is configured to recognize an AR marker (e.g., recognize the geometry by identifying portions of the marker) displayed on one of the smartphone 102, the laptop computer 104 and/or the tablet 106 to automatically authenticate the smartphone 102, the laptop computer 104 and/or the tablet 106 and allow connection to a shared experience session. In the shared experience session, the smartphone 102, the laptop computer 104 and/or the tablet 106 is able to view the augmented reality scene being viewed by the augmented reality head worn computer 108.

As described in more detail herein, this authentication process also initiates an alignment and orientation process to properly position the view of the end user computing device within the augmented reality environment (e.g., image registration). Thus, the coordinate system for the end user computing device is aligned with the augmented reality coordinate system of the augmented reality environment displayed by the augmented reality head worn computer 108. It should be noted that in various examples, the AR Marker is used to determine the location of the user device in the HoloLens® device space (e.g., a position or location of the user device is determined from the marker), which is parsed to the user device. As such, the user of the user device is able to view the augmented reality scene as if the user is wearing the HoloLens® device, but from a different viewpoint.

A process for joining an augmented reality session is illustrated in FIGS. 2-5. The process can be implemented as part of an augmented reality sharing tool that allows, for example, smartphone users to see what a HoloLens® user is seeing and doing, as well as to stream higher resolution (e.g., high-definition) augmented reality images of the augmented reality environment (e.g., real-world view with holograms).

Figure 2:
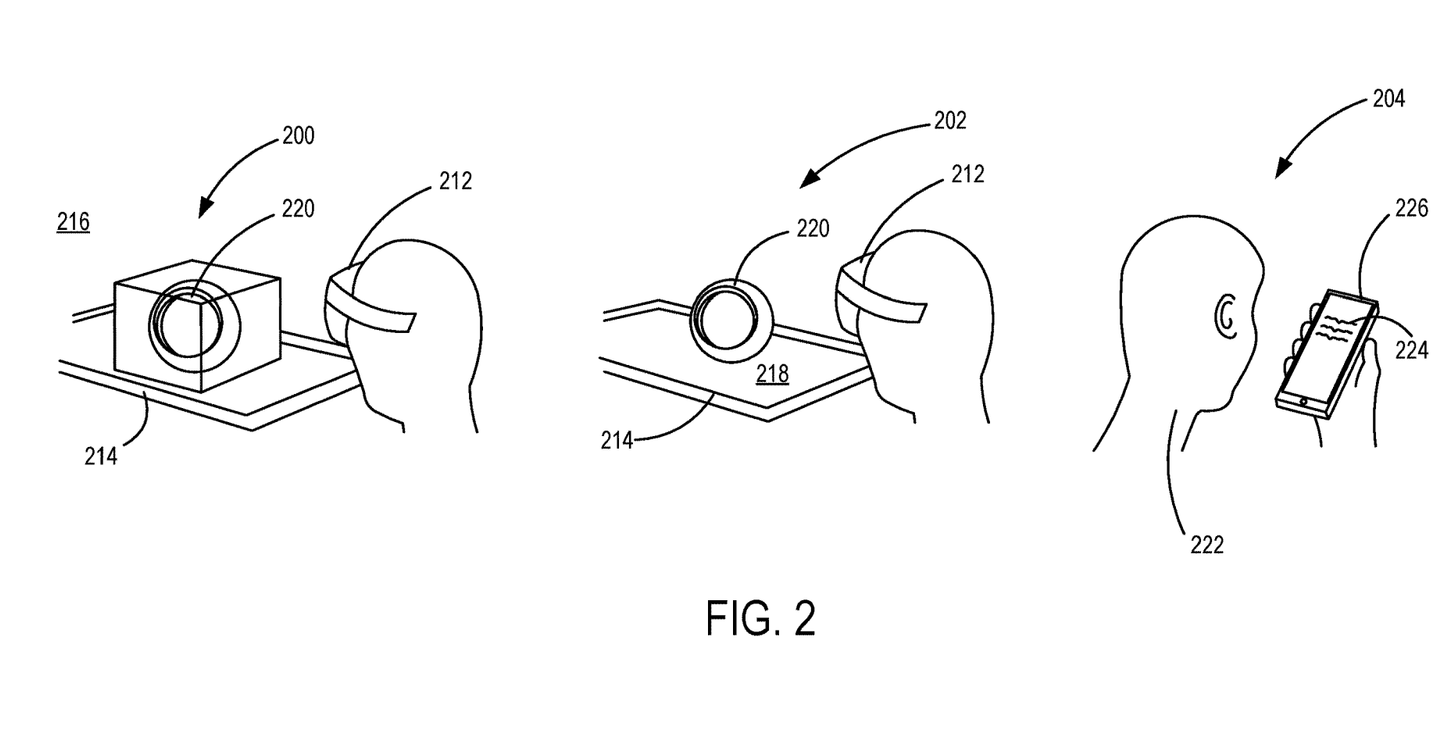
FIG. 2 illustrates an initialization process for joining a user device to an augmented reality session according to an embodiment.

In the illustrated embodiment, the operations can be performed in a different order than is shown, can include additional or fewer operations and can be modified as desired or needed. Additionally, one or more operations can be performed simultaneously, concurrently or sequentially. The process in one example includes:

1. At 200, the HoloLens® device (host) 212 adjusts a world container 214 in a room at 216. That is, the HoloLens® device 212 hosts and starts a session (e.g., a shared experience session). The world container in various examples is a virtual space defined within the physical room (e.g., on top of a table).

2. At 202, the HoloLens® device 212 places the world container 214. For example, the augmented reality system of the HoloLens® device 212 defines an augmented reality space 218 in which augmented reality objects (e.g., holograms) are placed, thereby allowing interaction with the augmented reality objects. In the illustrated example, the a spherical hologram 220 is the augmented reality object. The HoloLens® device 212 thereby defines the augmented reality environment to be experienced in the real-world scene.

3. At 204, a user 222 launches an application 224 (e.g., a session joining application) on a user device 226. For example, a smartphone user (e.g., iPhone® user) launches an augmented reality application, which in some examples is implemented in part using an AR kit configured for the smartphone (e.g., iPhone® ARKit). The launching of the application in some examples initiates an augmented reality session. For example, when the application 224 is launched on the user device 226, the user device 226 broadcasts a request to connect with the HoloLens® device 212 to join the augmented reality experience of the HoloLens® device 212. The request is broadcast within a defined range of the user device 226, such as based on the particular access point of a WiFi network to which the user device 226 is connected. In the illustrated example, the user device 226 and the HoloLens® device 212 are connected to the same WiFi network. Thus, in one example, the user device 226 broadcasts the request to all of the same application bundle ID sessions on the WiFi network. As such, other devices (not shown) within the same application bundle session, such as all HoloLens® devices 212 are notified of the request to join the session.

4. At 206, while the user device 226 finds one or more surfaces within the real-world (e.g., locates table, chairs and walls), the AR Kit on the user device 226 performs plane finding operations. For example, using a camera of the user device 226 and orientation/position sensors (e.g. gyroscopes) of the user device 226, real-world surfaces in a real-world view are identified (e.g., table, chairs and walls), while augmented reality plane discovery operations are being performed using plane finding techniques in the augmented reality technology. That is, planes within the augmented reality space having the world container 214 are identified.

Figure 3:
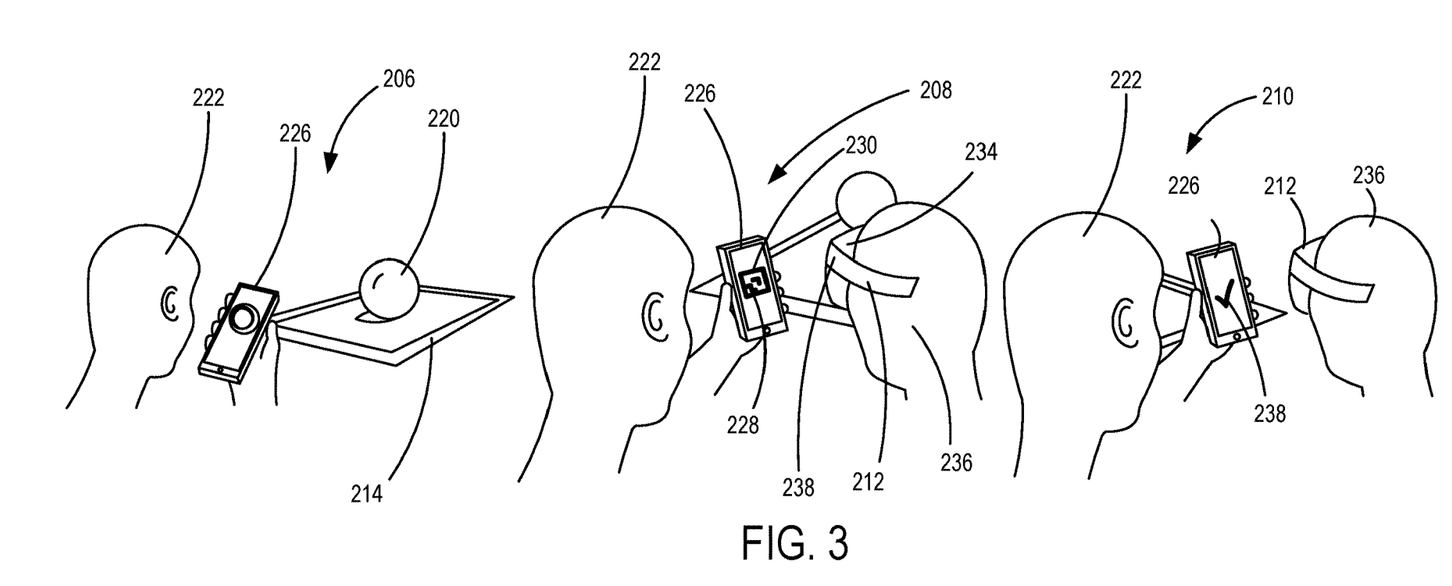
FIG. 3 illustrates an authentication process for joining a user device to an augmented reality session according to an embodiment.

5. At 208, an authentication code 228 is then generated (based in part on the determined location and orientation of the user device 226) and displayed on the user device 226. For example, an AR marker 232 (as shown more clearly in FIG. 4) is displayed on a screen 230 of a smartphone. It should be appreciated that the generation and display of the AR marker is 232 performed automatically in various examples, as a result of the launching of the application on the user device 226. The user device code, such as the AR marker 232, represents the ID for the user device 226 to allow connection to an available HoloLens® device 212. That is, the user device code identifies the device to the HoloLens® device 212 as a device of the user 222 that wants to join the augmented reality session. When the user device code is generated, the HoloLens® device 212 is notified of the generation of the code. For example, the AR marker 232 details are transmitted to the HoloLens® device 212 (such as through the WiFi network) to allow the HoloLens® device 212 to recognize a device displaying the AR marker 232.

As a result of a HoloLens® device 212 being notified of the user device code, the HoloLens® device 212 automatically turns on a camera 234 of the HoloLens® device 212 and starts searching for the AR marker 232. It should be noted that the user 236 of the HoloLens® device 212 in some examples is notified of the request received from the user device 226 (e.g., receipt of the AR marker 232). For example, a notification is displayed in the lens 238 of the HoloLens® device 212 that the user device 226 has requested connection to the augmented reality session. It should be noted that the code can be any code recognizable by the HoloLens® device 212 and used to validate or authenticate the user device 226 to allow the user device 226 to join the augmented reality session.

6. With the HoloLens® device 212 in the scanning mode, when any user device, including the user device 226, approaches the HoloLens® device 212, the HoloLens® device 212 scans the user device 226 at 210, for example, scans the display 230 of the user device 226. If an AR marker 232 is displayed on the user device 226, the HoloLens® device 212 scans the AR marker 232. If the AR marker 232 scanned matches the AR marker information received by the HoloLens® device 212 (i.e., the user device 226 that broadcast the request to join the augmented reality sessions) then the user device 226 is joined to the session as described below.

Figure 4:
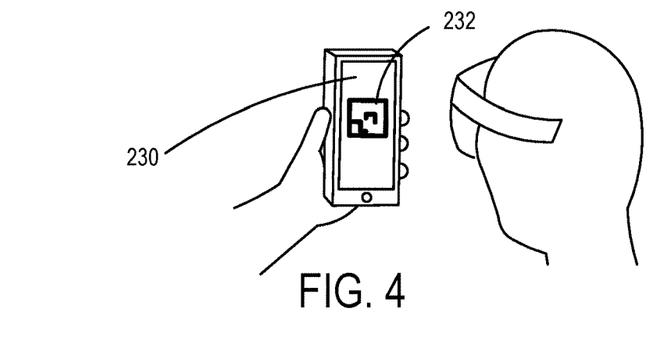
FIG. 4 illustrates an authentication code according to an embodiment.

In particular, in one example, the HoloLens® device 212 finds a code, such as the AR marker 232 and reads the ID (e.g., reads the ID of that marker). The HoloLens® device 212 is configured in some examples to process the AR marker 232 to identify defining characteristics to determine if the displayed code is a match. In one example, the HoloLens® device 212 then broadcasts the ID, such as using the WiFi network (or other wireless broadcasting technology), which is received by the user device 226. The user device 226 then compares the received ID to the ID generated by the user device 226 (e.g., the AR marker 232 generated by the user device 226 when the application was launched). If there is a match, the user device 226 then joins the augmented reality session and a confirmation indicator 238 is displayed in some examples. For example, through the augmented reality functionality of the user device 226, a connection is established and the user device 226 joins the augmented reality session using augmented reality sharing techniques in the augmented reality technology. It should be noted that the detection and identification of the AR marker 232 is performed using any AR marker detection process in the augmented reality technology.

Figure 5:
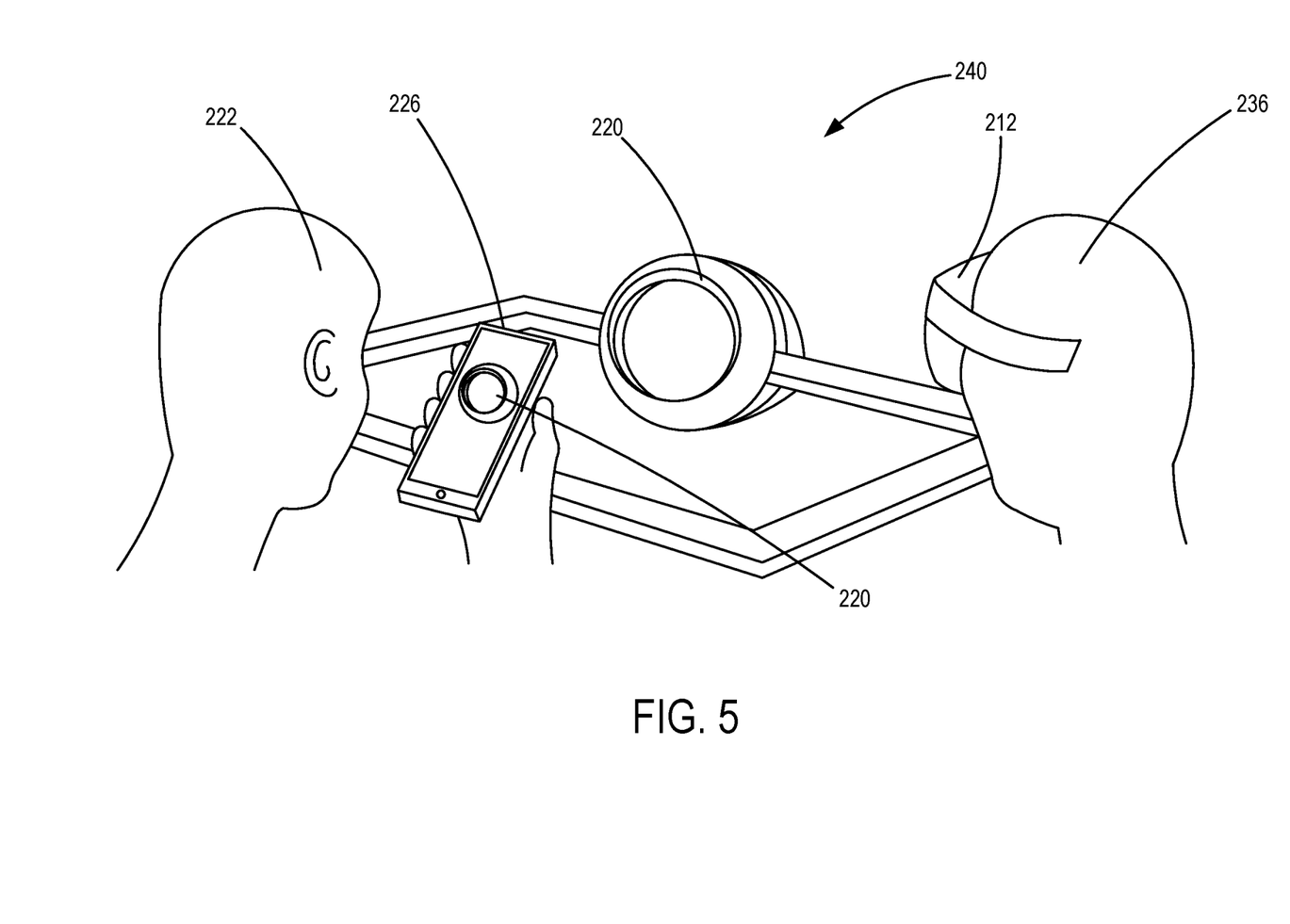
FIG. 5 illustrates a joining a user device to an augmented reality session according to an embodiment.

7. The user device 226 then displays the augmented reality environment as viewed by the HoloLens® device 212 at 240. That is, the augmented reality functionality of the user device 226 displays any holograms (the spherical hologram 220 in this example) within the augmented reality environment (world container) of the HoloLens® device 212 in the exact same plane as the HoloLens® device 212. That is, the hologram(s) are aligned in the coordinate system of the HoloLens® device 212. In one example, the alignment is accomplished by the HoloLens® device 212 sending spatial information to the user device 226. Thus, it should be appreciated that in various examples, images are not being communicated to the user device 226, but instead, data corresponding to the augmented reality environment of the HoloLens® device 212 is displayed. Moreover, once the user device 226 is joined to the augmented reality session of the HoloLens® device 212, the processing and control of the view of the augmented reality environment can be performed by the user device 226.

The augmented reality experience of the present disclosure allows the user device 226 to view the augmented reality environment of the HoloLens® device 212 in a spatially aligned scene. That is, the user device 226 is able to view and capture the augmented reality scene of the HoloLens® device 212 directly from the user device 226 (e.g., user is a spectator within the augmented reality environment). In this mode of operation, the user device 226 is able to, for example, film or record high-definition holograms. That is, the user device 226 is able to record holograms at the screen resolution of the user device 226, which in various examples is full high-definition. Additional imaging functionality of the user device 226 also can be performed, such as to apply antialiasing and shadowing functionality.

In some examples, with the user device 226 joined to the augmented reality session, the user device 226 is able to perform live streaming of the augmented reality environment. For example, the user device 226 is able to stream a live high-definition holographic experience to a streaming device lag free (e.g., stream to an Apple TV® device directly from an iPhone®).

In some examples, while joined to the session, the user device 226 is configured to invite guests to the augmented reality session. For example, the user device 226 is configured to add additional devices to allow other non-HoloLens device users to experience holograms directly from a phone or tablet (e.g., the additional devices each generate a code that is displayed and scanned by a camera of the user device 226 connected to the augmented reality session to thereby authenticate the additional devices to allow connection of the devices to the augmented reality session). It should be noted that the invitation process can be performed in different ways, including by directly sharing the augmented reality experience, transmitting a session ID to join, etc.

Thus, in some examples, the HoloLens® device 212 places one or more holograms and the shared experience of viewing the hologram(s) is initiated by launching an application on the user device 212. Once the user device 212 is connected to augmented reality session and viewing the hologram, the HoloLens® device 212 operates as the server and the user device 226 operates as the guest in one example.

In some examples, the present disclosure provides one or more of the following features:

1. Network auto-discovery for adding user device (e.g., mobile phones) to the session.
2. Automatic session handling, so users are added to the correct session.
3. Spatial synchronization of holograms, so all users see holograms in the exact same place (i.e., spatially aligned).
4. iOS® support (ARKit enabled devices).
5. Multiple iOS® guests.
6. Recording of video, holograms, ambient sound and/or hologram sounds.
7. A sharesheet so a user can save the video of the augmented reality scene, email the scene, or share the scene with other supporting application.

In some examples, the present disclosure is implemented in connection with one or more different licenses, such as an OpenCV license (3-clause BSD License) and a Unity ARKit license (MIT License). Additionally, one or more of the components described herein operate with a plugin and OpenCV binaries (e.g., UnityARKitPlugin and associated binaries).

Different network discovery technologies can be used in accordance with the present disclosure. In one example, UNET is used for network discovery and spatial synchronizing. As such, all interactivity during the application is synchronized between the devices. In various examples, UNET controls networking and manages all host-client connections.

The examples disclosed herein can be used with different types of augmented reality or alternate reality devices. In one example, the present disclosure contemplates implementation using a HoloLens® device and a Windows® computing device running, for example, Windows® 10, in combination with an ARKit compatible device (e.g., iPhone 6s or newer/iPad Pro 2016 or newer/iPad 2017 or newer) running iOS 11 or above. However, as should be appreciated, other operating environments are contemplated, such as with an Android® operating environment. Other operational examples include a Mac® device with xcode 9.2 or newer. In some examples, Microsoft® Visual Studio 2017 is implemented.

In one example, the augmented reality sharing arrangement described herein is set up by:

1. Preparing a scene.
2. Ensuring all visible gameobjects, within the scene, are contained under a world root gameobject.

3. Adding one or more prefabs according to the present disclosure to the scene.

4. Selecting a corresponding gameobject.

Thus, in some examples, using an application configured for the user device and augmented reality device, these devices can be connected together in the augmented reality experience (e.g., a smartphone and head-mounted augmented reality device connected to the same WiFi network). When the application is started on the devices (in no specific order), such as on a user device operating on the same network as the HoloLens® device, upon launching the application, the camera of the HoloLens® device is turned on and begins acquiring images and the user device turns on a camera and looks for surfaces (e.g., floor or table). The devices are then connected using a marker that is displayed on the user device and recognized by the HoloLens® device. The marker is no longer displayed once the marker is detected by the HoloLens® device, indicating to the user of the user device that the user device is connected to the augmented reality session of the HoloLens® device, and both devices are spatially synchronized as described herein.

It should be noted that the different features can be implemented using different input parameters. As an example, to capture and save a video from the user device, the user taps and holds the screen for one second, which opens a recording menu. Tapping a record button (e.g., a red record button) starts a countdown before beginning to record the screen. To finish recording, the user taps and holds the screen for another one second and taps the stop button. By clicking a preview button (e.g., a blue button), a user is able to watch the recorded video on the user device. The camera roll can be saved in some examples by opening a sharesheet.

It should be noted that application specific data is synchronized in various examples, such as using SyncVars, NetworkTransform, or NetworkBehavior, among others.

Thus, various examples allow user device access to augmented reality session that allows for streaming high quality, instant, third person views of holographic experiences, which can be displayed on a large screen (through a TV streaming device). With the present disclosure, multiple users can join the HoloLens® device experience by viewing the augmented reality environment directly from the user device. As such, portable device viewing of the augmented reality environment is easily accomplished.

Variations and modifications are contemplated. For example, the present disclosure can be implemented in connection with different operating platforms (e.g., Android® support). Video adjustments (e.g., focus and white balance) can be performed. A simple mobile input (e.g., augmented reality user interface) at the user device can be provided (e.g., phone users can interact with the augmented reality scene). Sound controls (e.g., mute, ambient and in-app sound) can be implemented. In some examples, a screenshot (photo option) is provided that allows for simple and fast screen capture. In some examples, longbow or other network solution support is provided.

Additionally, in some examples, a calibration process can be performed. For example, using a calibration pattern (e.g., defined printed calibration pattern), a camera of the user device scans the calibration pattern to confirm image calibration using image calibration techniques in the calibration technology.

The present disclosure can be implemented in different applications, such as:

Filming holograms in HD: Using various examples, a user can record a mixed reality experience using an iPhone®, including recording in full HD and apply anti-aliasing to holograms and shadows. Thus, a cost-effective and quick way to capture video of holograms is provided.

Live demonstrations: Stream live mixed reality experiences to an Apple TV® directly from an iPhone® or iPad®, with reduced lag or lag-free streaming Share the experience with guests: Let non-HoloLens users experience holograms directly from the user's phones or tablets.

Thus, joining an augmented reality session, such as with a user device (e.g., smartphone), can be performed easily and quickly using various examples by:

1. Ensuring that both devices are on the same Wi-Fi network.

2. Starting the application on the both devices, in no specific order. The process of starting the application on the user device (e.g., iPhone®) triggers the HoloLens® camera to turn on and begin taking pictures.

3. As soon as the user device application starts, the user device looks for surfaces like floors or tables. When surfaces are found, a marker is generated and shown to the HoloLens.

4. Once the marker has been detected by the HoloLens®, and authenticated, the marker disappears and both devices are connected and spatially synced.

Figure 6:
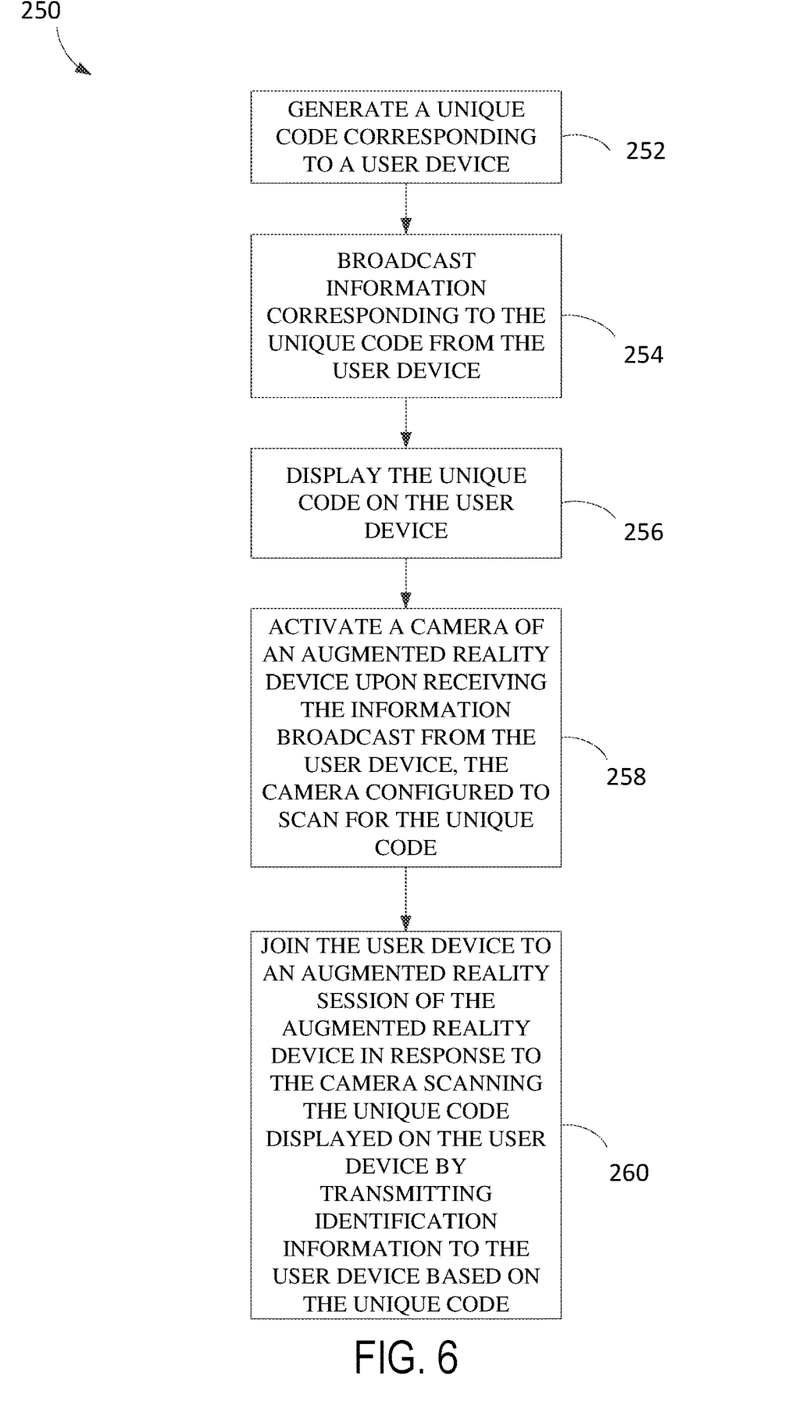
FIG. 6 is a flowchart of a process for viewing an augmented reality environment according to an embodiment.

Various examples include a method 250 for viewing an augmented reality environment. For example, as described herein, a user device is able to join to an augmented reality session of the augmented reality device. As described herein, holograms can be displayed in an augmented reality session that are spatially aligned to a view of a user device.

The method 250, in one example, includes generating a unique code corresponding to a user device at 252. As described herein, a unique AR marker is generated by a user device of a user that desires to join an augmented reality session (e.g., a shared experience session). This uniquely generated AR marker allows an augmented reality device, such as a head-mounted device that is operating in an augmented reality session, to authenticate the user device as described herein. The AR marker can be generated using any marker generation technique implemented by an augmented reality marker generator.

The method 250 includes broadcasting information corresponding to the unique code from the user device at 254. For example, a smartphone broadcasts AR marker information or session request information that is formatted or otherwise configured for detection by augmented reality devices. That is, the user device broadcasts information on a connected wireless network that is detectable by augmented reality devices and indicates that the user device desires to join the augmented reality session. In some examples, the augmented reality device invites the user device to join the augmented reality session.

The method 250 includes displaying the unique code on the user device at 256. For example, the AR marker associated with the broadcast information, and unique to the user device, is displayed on the screen of the user device. The AR maker is displayed for a defined time period in some examples, such as two minutes. The displayed AR marker allows for authentication of the user device to join the augmented reality session as a trusted device. As such, the user device can have a shared augmented reality session with an augmented reality device once authenticated.

The method 250 includes, at 258, activating a camera of the augmented reality device upon receiving the information broadcast from the user device, wherein the camera is configured to scan for the unique code. That is, with the received broadcast information, the augmented reality device is able to confirm that the displayed AR marker corresponds to the broadcast information. One or more AR marker matching techniques are used to compare the AR maker to the received information to confirm the match. For example, characteristics of the AR marker, as contained in the broadcast information, are identified and confirmed. If the AR marker does not match the received broadcast information, the user device is not authenticated (e.g., the user device did not broadcast the information). If the AR marker matches the received broadcast information, the user device is authenticated as the device that desires to join the augmented reality session.

The method 250 includes joining the user device to the augmented reality session of the augmented reality device at 260 in response to the camera scanning the unique code displayed on the user device by transmitting identification information to the user device based on the unique code. That is, once the AR marker is confirmed by the segmented reality device, an authentication or session acceptance signal is transmitted to the user device, which includes the connection information for joining the augmented reality session. For example, the session ID, connection ID, and/or other information to allow the user device to connect to the augmented reality session is transmitted.

Thus, various examples include a simple and secure authentication and connection process for joining an augmented reality session. The automated process allows a user device to be quickly identified by an augmented reality device and spatially aligned shared augmented reality session thereafter established as described herein.

Exemplary Operating Environment

The present disclosure is operable with a computing apparatus 302 according to an embodiment as a functional block diagram 300 in FIG. 3. In one example, components of the computing apparatus 302 can be implemented as a part of an electronic device according to one or more embodiments described in this specification. The computing apparatus 302 comprises one or more processors 304 which can be microprocessors, controllers or any other suitable type of processors for processing computer executable instructions to control the operation of the electronic device. Platform software comprising an operating system 306 or any other suitable platform software can be provided on the apparatus 302 to enable application software 308 to be executed on the device. According to an embodiment, viewing of an augmented reality environment 310 from a user device 312 can be accomplished by software.

The computing apparatus further includes an augmented reality (AR) session component 324. It should be noted that the AR session component 324 can be within one or more of the user device 312, the head worn computer 108 (shown in FIG. 1), or other components of the various examples. The AR session component 324 is configured to perform operations or methods described herein, including, for example, to initialize, authenticate and/or join the user device 312 (e.g., the smartphone 102 or the tablet 106) to the head worn computer 108 operating as an augmented reality device, such as illustrated in FIGS. 2-5.

Figure 7:
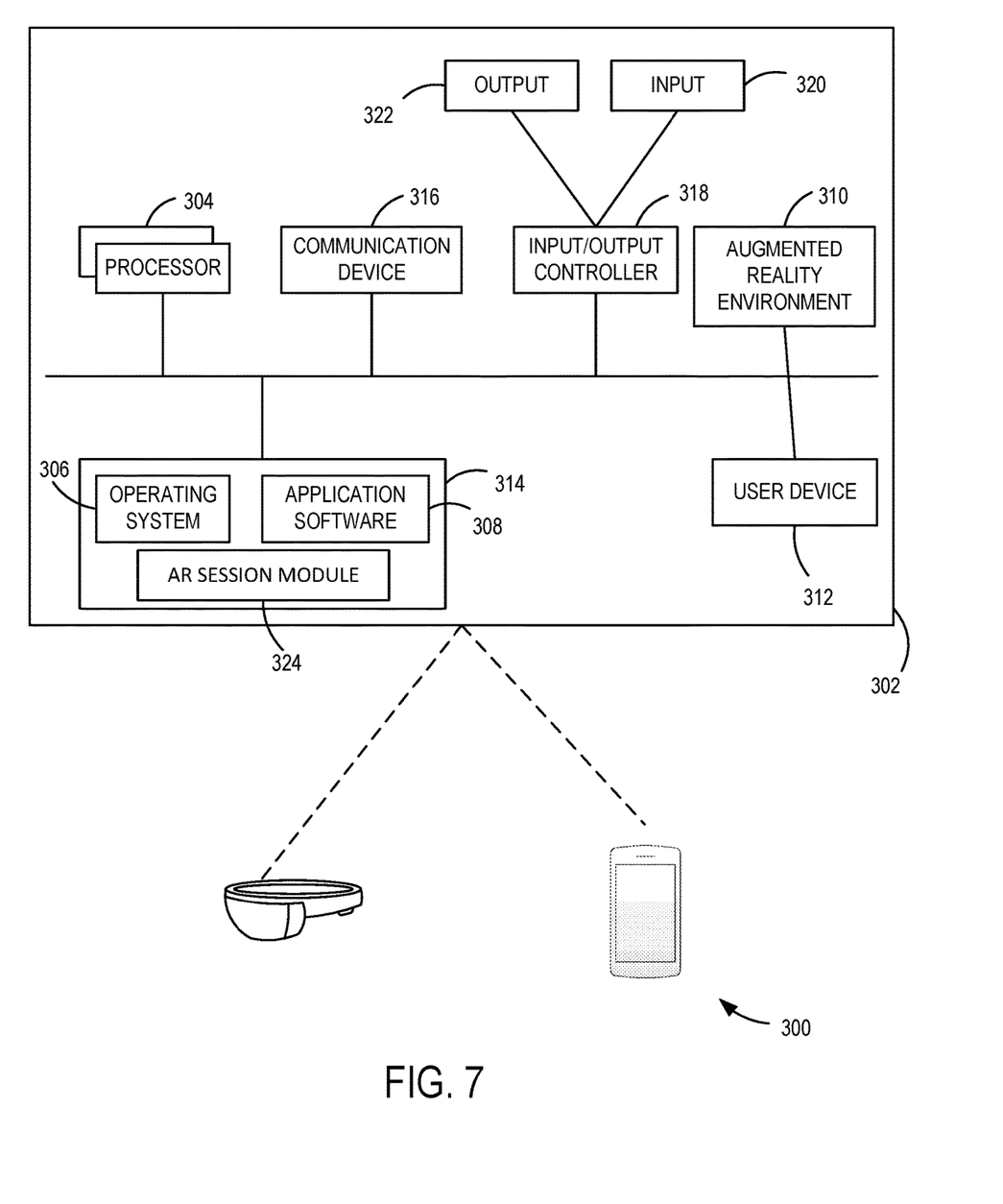
FIG. 7 illustrates a computing apparatus according to an embodiment as a functional block diagram.

A memory 314 stores, among other data, one or more applications or algorithms that include data and executable instructions. The applications, when executed by the processor, operate to perform functionality on the computing device. Exemplary applications include augmented reality applications and/or components, such as the AR session component 324, for example.

Computer executable instructions can be provided using any computer-readable media that are accessible by the computing apparatus 302. Computer-readable media may include, for example, computer storage media such as the memory 314 and communications media. Computer storage media, such as the memory 314, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 314) is shown within the computing apparatus 302, it will be appreciated by a person skilled in the art, that the storage may be distributed or located remotely and accessed via a network or other communication link (e.g. using a communication interface 316).

The computing apparatus 302 can comprise an input/output controller 318 configured to output information to one or more input devices 320 and output devices 322, for example a display or a speaker, which can be separate from or integral to the electronic device. The input/output controller 318 can also be configured to receive and process an input from the one or more input devices 320, for example, a keyboard, a microphone or a touchpad. In one embodiment, the output device 322 can also act as the input device 320. An example of such a device can be a touch sensitive display. The input/output controller 318 can also output data to devices other than the output device 322, e.g. a locally connected printing device. In some embodiments, a user can provide input to the input device(s) 320 and/or receive output from the output device(s) 322.

In some examples, the computing apparatus 302 detects voice input, user gestures or other user actions and provides a natural user interface (NUI). This user input can be used to author electronic ink, view content, select ink controls, play videos with electronic ink overlays and for other purposes. The input/output controller 318 outputs data to devices other than a display device in some examples, e.g. a locally connected printing device.

NUI technology enables a user to interact with the computing apparatus 302 in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

The functionality described herein can be performed, at least in part, by one or more hardware logic components. According to an embodiment, the computing apparatus 302 is configured by the program code when executed by the processor(s) 304 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures can be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices can accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform particular tasks or implement particular abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:

A system for augmented reality viewing, the system comprising:
 a memory associated with a computing device, the memory including an augmented reality session component; and
 a processor that executes the augmented reality session component to:
 generate a unique code corresponding to a user device;
 broadcast information corresponding to the unique code from the user device, the information configured to be received by an augmented reality device;
 display the unique code on the user device; and
 join the user device to an augmented reality session of the augmented reality device using received identification information from the augmented reality device and based at least in part on the displayed unique code.

Other examples include:

A computerized method for viewing an augmented reality environment, the computerized method comprising:
 generating a unique code at a user device and displaying the unique code on the user device;
 broadcasting information formatted for reception by an augmented reality device, the broadcast information based at least in part on the unique code; and
 automatically joining the user device to an augmented reality session of the augmented reality device in response to the augmented reality device scanning the unique code displayed on the user device, at least one hologram in the augmented reality session being spatially aligned to a view of the user device.

Other examples include:

One or more computer storage media having computer-executable instructions for viewing an augmented reality environment that, upon execution by a processor, cause the processor to at least:
 generate a unique code corresponding to a user device;
 broadcast information corresponding to the unique code from the user device, the information configured to be received by an augmented reality device;
 display the unique code on the user device; and
 join the user device to an augmented reality session of the augmented reality device using received identification information from the augmented reality device and based at least in part on the displayed unique code.

Alternatively, or in addition to the other examples described herein, examples include any combination of the following:
 spatially aligning a hologram being displayed in the augmented reality session to a view of the user device.
 activating the camera of the augmented reality device upon receiving the information broadcast from the user device, the camera configured to scan for the unique code.
 wherein an initiation of a session joining application on the user device triggers the activation of the camera of the augmented reality device based at least in part on a broadcasting of a request to identify bundle identification (ID) sessions on a same wireless network as the user device.

wherein the augmented reality device transmits identification information to the user device based on the unique code to confirm a match with the displayed unique code.

wherein the augmented reality device comprises a HoloLens® device, the user device comprises one of a mobile phone or a tablet device, and the unique code comprises an augmented reality marker, the mobile phone or the tablet device is configured to generate and display the augmented reality marker and the HoloLens® device is configured to scan for the augmented reality marker and match the augmented reality marker to the user device based at least in part on the information broadcast from the user device.

receiving spatial information from the augmented reality device and display an augmented reality session having at least one hologram being viewing by the augmented reality device with the hologram aligned spatially within the augmented reality space as viewed by the augmented reality device.

changing an augmented reality space of the augmented reality session based on a control command received from the user device.

Any range or device value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for training a neural network. The illustrated one or more processors 304 together with the computer program code stored in memory 314 constitute exemplary processing means for using and/or training neural networks.

The term "comprising" is used in this specification to mean including the feature(s) or act(s) followed thereafter, without excluding the presence of one or more additional features or acts.

In some examples, the operations illustrated in the figures can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for augmented reality viewing, the system comprising:
    a memory associated with a computing device, the memory including an augmented reality session component; and
    a processor that executes the augmented reality session component to:
    generate a unique code corresponding to a user device;
    broadcast information corresponding to the unique code from the user device, the information configured to be received by an augmented reality device;
    display the unique code on the user device, the unique code comprising a visual indicator; and
    join the user device to an augmented reality session of the augmented reality device using received identification information from the augmented reality device to authenticate the user device based at least in part on the displayed visual indicator.

2. The system of claim 1, wherein the processor further executes the augmented reality session component to spatially align a hologram being displayed in the augmented reality session to a view of the user device.

3. The system of claim 1, wherein the augmented reality device comprises a camera and the processor further executes the augmented reality session component to activate the camera of the augmented reality device upon receiving the information broadcast from the user device, the camera configured to scan for the visual indicator.

4. The system of claim 3, wherein an initiation of a session joining application on the user device triggers the activation of the camera of the augmented reality device based at least in part on a broadcasting of a request to identify bundle identification (ID) sessions on a same wireless network as the user device.

5. The system of claim 3, wherein the augmented reality device transmits identification information to the user device based on the visual indicator to confirm a match with the displayed visual indicator.

6. The system of claim 1, wherein the augmented reality device comprises a HoloLens® device, the user device comprises one of a mobile phone or a tablet device, and the visual indicator comprises an augmented reality marker, the mobile phone or the tablet device is configured to generate and display the augmented reality marker and the HoloLens® device is configured to scan for the augmented reality marker and match the augmented reality marker to the user device based at least in part on the information broadcast from the user device.

7. The system of claim 1, wherein the processor further executes the augmented reality session component to receive spatial information from the augmented reality device and display an augmented reality session having at least one hologram being viewing by the augmented reality device with the hologram aligned spatially within the augmented reality space as viewed by the augmented reality device.

8. The system of claim 1, wherein the processor further executes the augmented reality session component to change an augmented reality space of the augmented reality session based on a control command received from the user device.

9. A computerized method for viewing an augmented reality environment, the computerized method comprising:
generating a unique code at a user device and displaying the unique code on the user device, the unique code comprising a visual indicator;
broadcasting information formatted for reception by an augmented reality device, the broadcast information based at least in part on the visual indicator; and
automatically joining the user device to an augmented reality session of the augmented reality device in response to the augmented reality device scanning the visual indicator displayed on the user device to user device to authenticate the user device, at least one hologram in the augmented reality session being spatially aligned to a view of the user device.

10. The computerized method of claim 9, further comprising automatically activating a camera of the augmented reality device upon receiving the information broadcast from the user device, the camera configured to scan for the visual indicator.

11. The computerized method of claim 10, and further comprising, in response to an initiation of a session joining application on the user device, automatically triggering the activation of the camera of the augmented reality device based at least in part on a broadcasting of a request, from the user device, to identify bundle identification (ID) sessions on a same wireless network as the user device.

12. The computerized method of claim 9, wherein the augmented reality device comprises a HoloLens® device, the user device comprises one of a mobile phone or a tablet device, and visual indicator the comprises an augmented reality marker, the mobile phone or the tablet device is configured to generate and display the augmented reality marker and the HoloLens® device is configured to scan for the augmented reality marker and further comprising matching the augmented reality marker to the user device based at least in part on the information broadcast from the user device.

13. The computerized method of claim 9, receiving, at the user device, spatial information from the augmented reality device and displaying the augmented reality session having at least one hologram being viewing by the augmented reality device with the hologram aligned spatially within the augmented reality space as viewed by the augmented reality device.

14. The computerized method of claim 9, further comprising, after joining the user device to the augmented reality session, receiving one or more control commands from the user device that changes the augmented reality space.

15. The computerized method of claim 9, further comprising recording the augmented reality session at the user device.

16. One or more computer storage media having computer-executable instructions for viewing an augmented reality environment that, upon execution by a processor, cause the processor to at least:
generate a unique code corresponding to a user device;
broadcast information corresponding to the unique code from the user device, the information configured to be received by an augmented reality device;
display the unique code on the user device, the unique code comprising a visual indicator; and
join the user device to an augmented reality session of the augmented reality device using received identification information from the augmented reality device to authenticate the user device based at least in part on the displayed visual indicator.

17. The one or more computer storage media of claim 16 having further computer-executable instructions that, upon execution by a processor, cause the processor to at least spatially align a hologram being displayed in the augmented reality session to a view of the user device.

18. The one or more computer storage media of claim 16, wherein the augmented reality device comprises a camera and having further computer-executable instructions that, upon execution by a processor, cause the processor to at least activate the camera of the augmented reality device upon receiving the information broadcast from the user device, the camera configured to scan for the visual indicator.

19. The one or more computer storage media of claim 16, wherein an initiation of a session joining application on the user device triggers the activation of the camera of the augmented reality device based at least in part on a broadcasting of a request to identify bundle identification (ID) sessions on a same wireless network as the user device.

20. The one or more computer storage media of claim 16 having further computer-executable instructions that, upon execution by a processor, cause the processor to at least receive spatial information from the augmented reality device and display an augmented reality session having at least one hologram being viewing by the augmented reality device with the hologram aligned spatially within the augmented reality space as viewed by the augmented reality device, and change an augmented reality space of the augmented reality session based on a control command received from the user device.

* * * * *